United States Patent
Onogi et al.

(10) Patent No.: US 12,535,346 B2
(45) Date of Patent: Jan. 27, 2026

(54) FLUIDIC DEVICE AND METHOD FOR CONTROLLING FLUIDIC DEVICE

(71) Applicant: SEIKO EPSON CORPORATION, Tokyo (JP)

(72) Inventors: Tomohide Onogi, Shiojiri (JP); Chikara Kojima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 364 days.

(21) Appl. No.: 18/156,535

(22) Filed: Jan. 19, 2023

(65) Prior Publication Data
US 2023/0228604 A1 Jul. 20, 2023

(30) Foreign Application Priority Data
Jan. 20, 2022 (JP) ................................ 2022-006963

(51) Int. Cl.
| | |
|---|---|
| *G01F 1/667* | (2022.01) |
| *G01F 23/2962* | (2022.01) |
| *G01N 29/024* | (2006.01) |
| *G01N 29/22* | (2006.01) |
| *B01L 3/00* | (2006.01) |

(52) U.S. Cl.
CPC .......... *G01F 1/667* (2013.01); *G01F 23/2962* (2013.01); *G01N 29/024* (2013.01); *G01N 29/222* (2013.01); *B01L 3/502761* (2013.01); *G01N 2291/045* (2013.01); *G01N 2291/101* (2013.01)

(58) Field of Classification Search
CPC ... G01F 1/667; G01F 23/2962; G01N 29/024; G01N 29/222; G01N 2291/045; G01N 2291/101; B01L 3/502761
See application file for complete search history.

(56) References Cited

U.S. PATENT DOCUMENTS

| | | | | |
|---|---|---|---|---|
| 2014/0318225 | A1* | 10/2014 | Kersey | G01N 15/0255 73/61.72 |
| 2016/0193613 | A1* | 7/2016 | Walti | B03C 5/005 204/547 |
| 2018/0188210 | A1* | 7/2018 | Nielsen | G01N 29/222 |

OTHER PUBLICATIONS

Ota et al., "Enhancement in acoustic focusing of micro and nanoparticles by thinning a microfluidic device." Royal Society Open Science, Oct. 19, 2018.

* cited by examiner

*Primary Examiner* — Benjamin R Schmitt
(74) *Attorney, Agent, or Firm* — CHIP LAW GROUP

(57) ABSTRACT

A fluidic device 10 includes: a channel 20 that extends along an X axis and through which a fluid S flows; a standing wave generation part 30 that generates a standing wave SW transmitting along a Y axis in the fluid S in the channel 20; a transmission and reception part 40 that transmits an ultrasonic wave to the fluid S in the channel 20 and receives the ultrasonic wave transmitted through the fluid S; a time-of-flight measurement unit 55 that measures a time of flight that is a period of time from when the transmission and reception part 40 transmits the ultrasonic wave to when the transmission and reception part 40 receives the ultrasonic wave; and a drive control unit 582 that controls driving of the standing wave generation part 30 based on the time of flight of the ultrasonic wave.

2 Claims, 5 Drawing Sheets

FLUIDIC DEVICE AND METHOD FOR CONTROLLING FLUIDIC DEVICE

The present application is based on, and claims priority from JP Application Serial Number 2022-006963, filed Jan. 20, 2022, the disclosure of which is hereby incorporated by reference herein in its entirety.

BACKGROUND

1. Technical Field

The present disclosure relates to a fluidic device and a method for controlling a fluidic device.

2. Related Art

In the related art, a fluidic device that performs acoustic focusing of fine particles in a fluid has been known. For example, a fluidic device disclosed in "Enhancement in acoustic focusing of micro and nanoparticles by thinning a microfluidic device" (Nobutoshi Ota and 6 others, December 2019, Royal Society Open Science, Volume 6, Issue 2, Article No. 181776) (Non-Patent Literature 1) includes a channel substrate (glass substrate) in which a channel is formed, and a piezoelectric element provided at the channel substrate. An ultrasonic wave generated by the piezoelectric element is transmitted into the channel via the channel substrate, and a standing wave is generated in a fluid in the channel. Fine particles in the fluid are captured in a predetermined range in the channel due to a pressure gradient of the fluid formed by the standing wave.

The fluidic device disclosed in Non-Patent Literature 1 causes the fine particles to converge in the fluid by the standing wave generated based on the ultrasonic wave, but it is difficult to stably generate the standing wave because a generation condition of the standing wave changes due to disturbance such as a temperature change.

SUMMARY

A fluidic device according to a first aspect of the present disclosure includes: a channel that extends along a first axis and through which a fluid flows; a standing wave generation part that generates a standing wave transmitting along a second axis orthogonal to the first axis in the fluid in the channel; a transmission and reception part that transmits an ultrasonic wave to the fluid in the channel and receives the ultrasonic wave transmitted through the fluid; a time-of-flight measurement unit that measures a time of flight that is a period of time from when the transmission and reception part transmits the ultrasonic wave to when the transmission and reception part receives the ultrasonic wave; and a drive control unit that controls driving of the standing wave generation part based on the time of flight.

In the fluidic device according to the first aspect, the standing wave generation part may be a first ultrasonic element disposed at the channel; the transmission and reception part may be a second ultrasonic element disposed at a position different from a position of the first ultrasonic element in the channel; the time-of-flight measurement unit may measure the time of flight that is a period of time from when the second ultrasonic element transmits the ultrasonic wave to when the second ultrasonic element receives a reflected wave of the ultrasonic wave; and the drive control unit may control a drive frequency of the first ultrasonic element based on the time of flight.

In the fluidic device according to the first aspect, the standing wave generation part may be a first ultrasonic element disposed at the channel; the transmission and reception part may include a second ultrasonic element that is disposed at a position different from a position of the first ultrasonic element in the channel and that transmits the ultrasonic wave to the fluid in the channel, and a third ultrasonic element that is disposed at a position facing the second ultrasonic element in the channel and that receives the ultrasonic wave transmitted from the second ultrasonic element and transmitted through the fluid in the channel; the time-of-flight measurement unit may measure the time of flight that is a period of time from when the second ultrasonic element transmits the ultrasonic wave to when the third ultrasonic element receives the ultrasonic wave; and the drive control unit may control a drive frequency of the first ultrasonic element based on the time of flight.

In the fluidic device according to the first aspect, the standing wave generation part and the transmission and reception part may be implemented by the same ultrasonic element, a switch part may be further provided that is configured to switch between a first mode in which the ultrasonic element operates as the standing wave generation part and a second mode in which the ultrasonic element operates as the transmission and reception part, the time-of-flight measurement unit may measure the time of flight that is a period of time from when the ultrasonic element in the second mode transmits the ultrasonic wave to when the ultrasonic element in the second mode receives the ultrasonic wave, and the drive control unit may control a drive frequency of the ultrasonic element in the first mode.

According to a second aspect of the present disclosure, there is provided a method for controlling a fluidic device. The fluid device includes: a channel that extends along a first axis and through which a fluid flows; a standing wave generation part that generates a standing wave transmitting along a second axis orthogonal to the first axis in the fluid in the channel; and a transmission and reception part that transmits an ultrasonic wave to the fluid in the channel and receives the ultrasonic wave transmitted through the fluid. The control method includes: a measurement step of measuring a time of flight that is a period of time from when the transmission and reception part transmits the ultrasonic wave to when the transmission and reception part receives the ultrasonic wave; and a control step of controlling driving of the standing wave generation part based on the time of flight.

DESCRIPTION OF EXEMPLARY EMBODIMENTS

First Embodiment

Hereinafter, a fluidic device 10 according to a first embodiment will be described with reference to FIG. 1.

Figure 1:
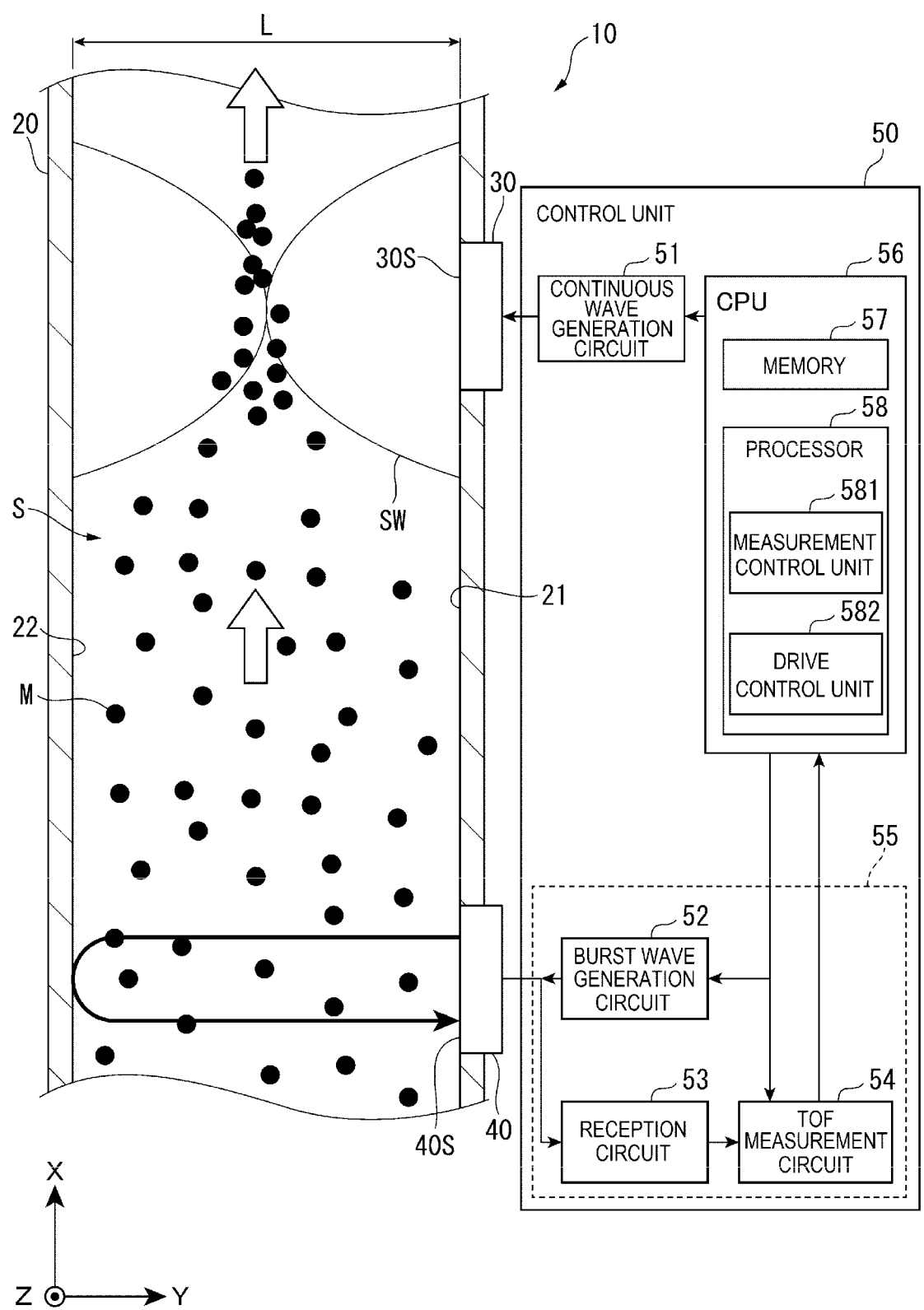
FIG. 1 is a diagram schematically illustrating a fluidic device according to a first embodiment.

FIG. 1 is a cross-sectional view schematically illustrating the fluidic device 10 according to the first embodiment.

The fluidic device 10 includes a channel 20, a standing wave generation part 30, a transmission and reception part 40, and a control unit 50. The channel 20 extends along an X axis that is a first axis, and allows a fluid S to flow therethrough. The standing wave generation part 30 generates a standing wave SW transmitting along a Y axis, which is a second axis, in the fluid S in the channel 20. The transmission and reception part 40 transmits an ultrasonic wave to the fluid S in the channel 20 and receives the ultrasonic wave transmitted through the fluid S. The control unit 50 controls driving of the standing wave generation part 30. Note that the X axis and the Y axis are axes orthogonal to each other, and an axis orthogonal to each of the X axis and the Y axis is taken as a Z axis.

In the fluidic device 10, the standing wave SW of any mode order is formed along a Y-axis direction in a partial region in an X-axis direction in the channel 20. Fine particles M dispersed in the fluid S are affected by a pressure gradient formed due to the standing wave SW in the process of flowing through the channel 20, and converge in a predetermined range centered on a node of the standing wave SW. The fluid S is not particularly limited, and is, for example, water or blood. The fine particles M may be, for example, microfibers or cells.

In such a fluidic device 10, for example, the fine particles M in the fluid S can be concentrated by providing the channel 20 with a concentration channel for selectively flowing the fluid S containing the converged fine particles M and a discharge channel for selectively flowing the rest fluid S.

In FIG. 1, a state of the fine particles M converged in the channel 20 is schematically illustrated. In addition, in FIG. 1, as an example, the standing wave SW of a first-order mode generated in the channel 20 is schematically illustrated, but the mode order of the standing wave SW is not particularly limited.

The channel 20 includes a first wall surface 21 and a second wall surface 22 facing each other in the Y-axis direction. A channel width L between the first wall surface 21 and the second wall surface 22 is a known value. A specific configuration of the channel 20 is not particularly limited. For example, the channel 20 is formed of a base substrate formed with a recessed groove and a lid substrate covering the recessed groove, and a glass substrate, a silicon substrate, or the like can be used as each substrate.

Although not illustrated, the channel 20 is provided with an injection port for injecting the fluid S into the channel 20 and one or more discharge ports for discharging the fluid S from the channel 20. When the channel 20 is provided with the concentration channel and the discharge channel as described above, a discharge port is provided for each of these channels.

The standing wave generation part 30 is an ultrasonic element (first ultrasonic element) provided at the channel 20, and generates the standing wave SW in the fluid S by transmitting an ultrasonic wave of a predetermined frequency to the fluid S in the channel 20. In the present embodiment, an ultrasonic transmission surface 30S of the standing wave generation part 30 constitutes a part of the first wall surface 21 of the channel 20, and generates the standing wave SW transmitting along the Y-axis direction.

The transmission and reception part 40 is an ultrasonic element (second ultrasonic element) disposed at a position different from that of the standing wave generation part 30 in the channel 20, and transmits an ultrasonic wave of any frequency to the fluid S in the channel 20. In addition, when receiving the ultrasonic wave transmitted through the fluid S, the transmission and reception part 40 outputs a reception signal corresponding to the ultrasonic wave. In particular, in the present embodiment, an ultrasonic transmission and reception surface 40S of the transmission and reception part 40 constitutes a part of the first wall surface 21 of the channel 20, transmits an ultrasonic wave, and receives the ultrasonic wave reflected by the second wall surface 22 of the channel 20.

A specific configuration of the ultrasonic element constituting the standing wave generation part 30 or the transmission and reception part 40 is not particularly limited. For example, the ultrasonic element may have a configuration of vibrating a piezoelectric actuator, a configuration of vibrating a vibration plate on which a piezoelectric thin film is formed, or a configuration of vibrating a vibration plate provided in an electrostatic actuator. Such an ultrasonic element generates vibration when a voltage as a drive signal is applied thereto, and transmits an ultrasonic wave.

A relative position of the transmission and reception part 40 with respect to the standing wave generation part 30 is not particularly limited. The transmission and reception part 40 is preferably disposed at a position that is away from the standing wave generation part 30 to such an extent that the generation of the standing wave SW is not affected, and where a temperature of the fluid S is approximately the same at an ultrasonic wave transmission region of the transmission and reception part 40 and at a generation region of the standing wave SW.

The control unit 50 includes a continuous wave generation circuit 51 coupled to the standing wave generation part 30, a burst wave generation circuit 52 and a reception circuit 53 coupled to the transmission and reception part 40, a TOF measurement circuit 54 coupled to the reception circuit 53, and a central processing unit (CPU) 56 that controls the circuits.

The continuous wave generation circuit 51 forms a drive signal of a predetermined frequency based on the control of the CPU 56, and continuously outputs the drive signal to the standing wave generation part 30. The frequency of the drive signal formed by the continuous wave generation circuit 51 (hereinafter, referred to as a drive frequency Fd) is a frequency set so as to form a standing wave in the fluid S.

The burst wave generation circuit 52 forms a drive signal of any frequency in response to a measurement request from the CPU 56, and outputs a drive signal to the transmission and reception part 40 for a predetermined time.

The reception circuit 53 is configured including, for example, an amplification circuit and a detection circuit, performs signal processing on a reception signal output when the transmission and reception part 40 receives an ultrasonic wave, and outputs the reception signal subjected to the signal processing to the TOF measurement circuit 54.

The TOF measurement circuit 54 measures a time of flight (TOF value), which is a period of time from when the transmission and reception part 40 transmits an ultrasonic wave to when the transmission and reception part 40 receives the ultrasonic wave, based on a timing signal input simultaneously with a request from the CPU 56 to the burst wave generation circuit 52 and a reception signal input from the reception circuit 53.

In the present embodiment, the burst wave generation circuit 52, the reception circuit 53, and the TOF measurement circuit 54 constitute a time-of-flight measurement unit 55 for measuring the TOF value.

The CPU 56 includes a memory 57 in which various programs and various types of data are stored, and a processor 58 that executes the programs stored in the memory 57.

The memory 57 stores a value of a current drive frequency Fd of the standing wave generation part 30, and the like.

By executing a program stored in the memory 57, the processor 58 functions as a measurement control unit 581 that outputs a measurement request to the burst wave generation circuit 52, and a drive control unit 582 that controls the drive frequency Fd of the standing wave generation part 30 based on the TOF value measured by the TOF measurement circuit 54.

Next, control of the fluidic device 10 of the present embodiment will be described with reference to the flowchart in FIG. 2. Hereinafter, control during the generation of the standing wave in the fluidic device 10 will be described.

First, in a case where a predetermined measurement timing set in advance is reached (step S1: YES), when the measurement control unit 581 outputs a measurement request to the burst wave generation circuit 52, the burst wave generation circuit 52 outputs, for a predetermined time, a drive signal for forming a burst wave (step S2). Accordingly, the transmission and reception part 40 transmits an ultrasonic wave for a predetermined time in accordance with the drive signal input from the burst wave generation circuit 52. The ultrasonic wave is transmitted to the fluid S, reflected by the second wall surface 22 of the channel 20, and then received by the transmission and reception part 40. The transmission and reception part 40 outputs a reception signal corresponding to the received ultrasonic wave, and the TOF measurement circuit 54 measures a TOF value, which is a period of time from when the transmission and reception part 40 transmits the ultrasonic wave to when the transmission and reception part 40 receives the ultrasonic wave, based on the reception signal.

Next, the drive control unit 582 obtains an optimum drive frequency Fs for generating a standing wave in the fluid S in the channel 20, based on the TOF value input from the TOF measurement circuit 54 (step S3).

Here, a condition for generating a standing wave in the fluid S in the channel 20 is expressed by the following formula (1). In the formula, Fs is an optimum drive frequency, m is an order of the standing wave SW, c is a sound velocity in the fluid S, and L is the channel width of the channel 20.

$$Fs = \frac{mc}{2L} \quad (1)$$

According to the transmission and reception part 40 of the first embodiment, a distance the ultrasonic wave covers in the fluid S in order to measure the TOF value is 2 L, and thus the sound velocity c in the fluid S is expressed by the following formula (2). In the formula, TOF is a TOF value measured by the TOF measurement circuit 54.

$$C = \frac{2L}{TOF} \quad (2)$$

According to the above formulas (1) and (2), the optimum drive frequency Fs is expressed by the following formula (3).

$$Fs = \frac{m}{TOF} \quad (3)$$

Therefore, in step S3, the optimum drive frequency Fs can be obtained by substituting the TOF value measured by the TOF measurement circuit 54 into the formula (3). It is assumed that the order m of the standing wave SW is determined in advance and is stored in the memory 57 or the like. Steps S2 and S3 correspond to a measurement step.

Thereafter, the drive control unit 582 refers to the memory 57 and determines whether the optimum drive frequency Fs obtained in step S3 coincides with the current drive frequency Fd of the standing wave generation part 30 (step S4). When an absolute value of a difference between the current drive frequency Fd and the optimum drive frequency Fs is equal to or less than a predetermined threshold, the drive control unit 582 may determine that the current drive frequency Fd and the optimum drive frequency Fs coincide with each other.

When it is determined that the optimum drive frequency Fs coincides with the current drive frequency Fd (step S4: YES), the processing in the control unit 50 returns to step S1.

On the other hand, when it is determined that the optimum drive frequency Fs does not coincide with the current drive frequency Fd of the standing wave generation part 30 (step S4: NO), the drive control unit 582 adjusts the drive frequency Fd so that the drive frequency Fd coincides with the optimum drive frequency Fs (step S5; control step). Thereafter, the processing in the control unit 50 returns to step S1.

In the control unit 50, it is preferable that the measurement timing is repeated at predetermined intervals set in advance, and the processing in the above-described flowchart is repeatedly performed.

Effects of First Embodiment

As described above, the fluidic device 10 of the present embodiment includes: the channel 20 that extends along the X axis and through which the fluid S flows; the standing wave generation part 30 that generates the standing wave SW transmitting along the Y axis in the fluid S in the channel 20; the transmission and reception part 40 that transmits an ultrasonic wave to the fluid S in the channel 20 and receives the ultrasonic wave transmitted through the fluid S; the time-of-flight measurement unit 55 that measures a time of flight (TOF value) that is a period of time from when the transmission and reception part 40 transmits the ultrasonic wave to when the transmission and reception part 40 receives the ultrasonic wave; and the drive control unit 582 that controls the driving of the standing wave generation part 30 based on a TOF value.

The fluidic device 10 causes the standing wave generation part 30 to generate the standing wave SW in the fluid S in the channel 20. In the fluidic device 10, when a temperature of the fluid S changes, the sound velocity in the fluid S changes, and thus a driving condition of the standing wave generation part 30 for generating the standing wave SW also changes.

Therefore, in the present embodiment, the time-of-flight measurement unit 55 measures a TOF value relating to the sound velocity in the fluid S, and the drive control unit 582 controls the driving of the standing wave generation part 30 based on the TOF value. Accordingly, the driving of the standing wave generation part 30 can be feedback-controlled in accordance with the temperature change of the fluid S. As a result, the standing wave SW can be stably generated.

In order to perform the control following the temperature change of the fluid S, a method of providing a temperature sensor in the channel 20 to directly measure the temperature of the fluid S may be considered. However, a load on calculation processing of obtaining the driving condition of the standing wave generation part 30 based on the temperature of the fluid S is large. On the other hand, in the present embodiment, by using the TOF value in the fluid S instead of the temperature of the fluid S, it is possible to easily obtain the optimum drive frequency Fs that is the driving condition of the standing wave generation part 30, and it is possible to reduce the load on the calculation processing.

In the present embodiment, the standing wave generation part 30 is a first ultrasonic element disposed in the channel 20, the transmission and reception part 40 is a second ultrasonic element disposed at a position different from that of the standing wave generation part 30 in the channel 20, the time-of-flight measurement unit 55 measures a TOF value that is a period of time from when the transmission and reception part 40 transmits an ultrasonic wave to when the transmission and reception part 40 receives a reflected wave of the ultrasonic wave, and the drive control unit 582 controls the drive frequency of the standing wave generation part 30 based on the TOF value.

With such a configuration, the transmission and reception part 40 can be simply implemented by using the reflected wave in the channel 20.

In addition, in the present embodiment, when water is used as the fluid S, it is possible to provide the fluidic device 10 capable of appropriately separating the fine particles M contained in the water, and it is possible to widen the range of use. For example, when domestic wastewater discharged from a washing machine or a kitchen is caused to flow into the fluidic device 10, fine particles contained in the domestic wastewater can be separated. In this case, it is possible to separate fine plastic fibers contained in washing water, polishing powder of a detergent contained in the wastewater of the kitchen, and the like, and it is also possible to prevent environmental damage caused by substances such as plastic waste.

However, the fluid S is not limited to water. For example, when blood is used as the fluid S, it is possible to provide the fluidic device 10 capable of separating a cell component contained in the blood. When the cell component is cancer cells in blood, the cancer cells contained in the blood can be separated and removed, and metastasis of cancer can be prevented.

Second Embodiment

Next, a fluidic device 10A according to a second embodiment will be described with reference to FIG. 3.

Figure 3:
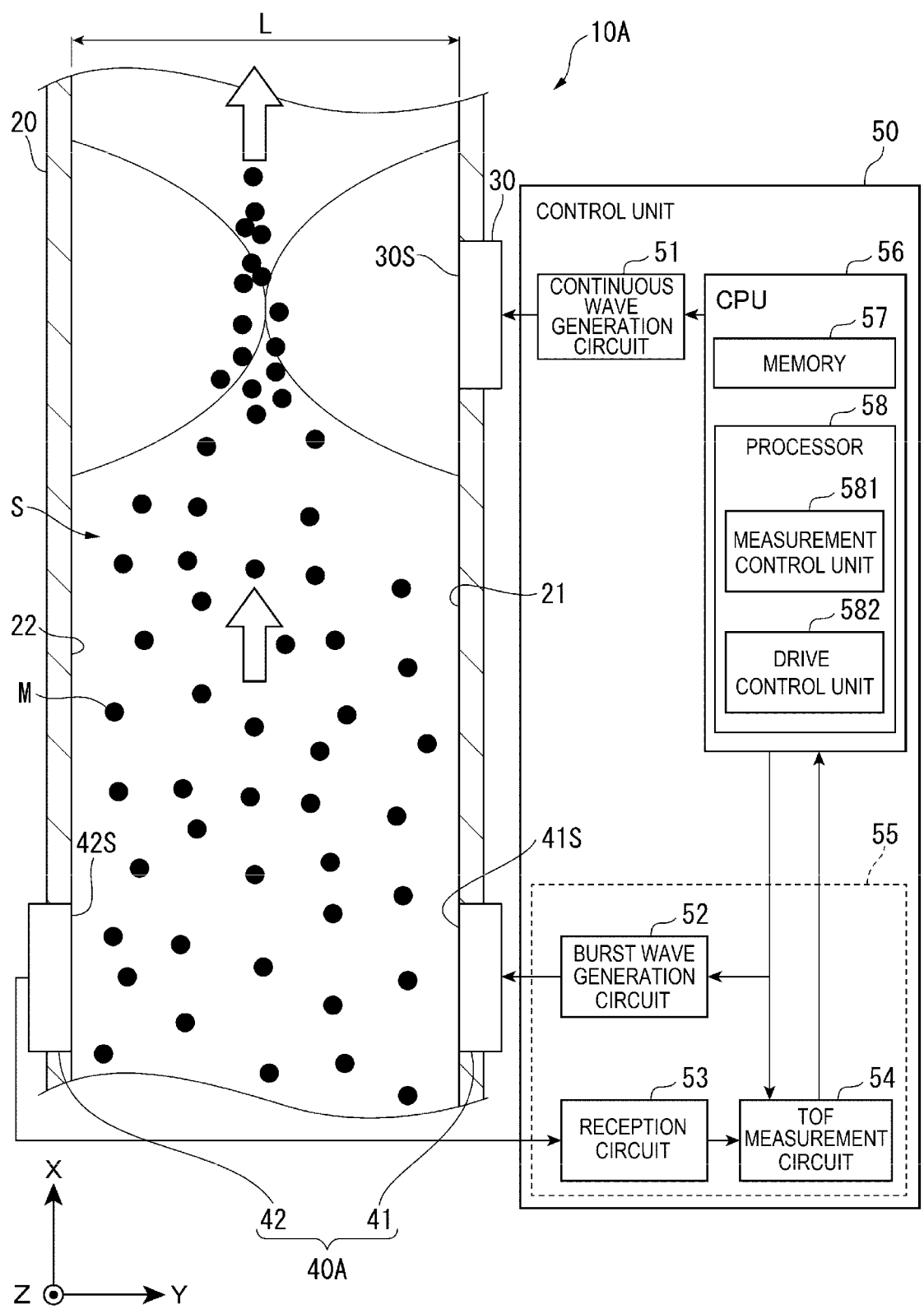
FIG. 3 is a diagram schematically illustrating a fluidic device according to a second embodiment.

FIG. 3 is a diagram schematically illustrating the fluidic device 10A according to the second embodiment.

The fluidic device 10A has substantially the same configuration as the fluidic device 10 of the first embodiment except for a configuration of a transmission and reception part 40A. In the following description, the same components as those in the first embodiment are denoted by the same reference signs, and a description thereof will be omitted or simplified.

In the second embodiment, the transmission and reception part 40A includes a second ultrasonic element 41 and a third ultrasonic element 42 disposed at positions different from that of the standing wave generation part 30 (that is, the first ultrasonic element) in the channel 20. The second ultrasonic element 41 transmits an ultrasonic wave of any frequency to the fluid S in the channel 20. The third ultrasonic element 42 is disposed so as to face the second ultrasonic element 41. When an ultrasonic wave that is transmitted from the second ultrasonic element 41 and transmitted through the fluid S is received by the third ultrasonic element 42, the third ultrasonic element 42 outputs a reception signal corresponding to the ultrasonic wave.

In particular, in the present embodiment, an ultrasonic transmission surface 41S of the second ultrasonic element 41 constitutes a part of the first wall surface 21 of the channel 20, and an ultrasonic wave reception surface 42S of the third ultrasonic element 42 constitutes a part of the second wall surface 22 of the channel 20.

The burst wave generation circuit 52 forms a drive signal of any frequency in response to a measurement request from the CPU 56, and outputs a drive signal to the second ultrasonic element 41 of the transmission and reception part 40A for a predetermined time.

The reception circuit 53 is configured including, for example, an amplification circuit and a detection circuit, performs signal processing on a reception signal output when the third ultrasonic element 42 of the transmission and reception part 40A receives an ultrasonic wave, and outputs the reception signal subjected to the signal processing to the TOF measurement circuit 54.

The TOF measurement circuit 54 measures a time of flight (TOF value) that is a period of time from when the second ultrasonic element 41 transmits an ultrasonic wave to when the third ultrasonic element 42 receives the ultrasonic wave.

Figure 2:
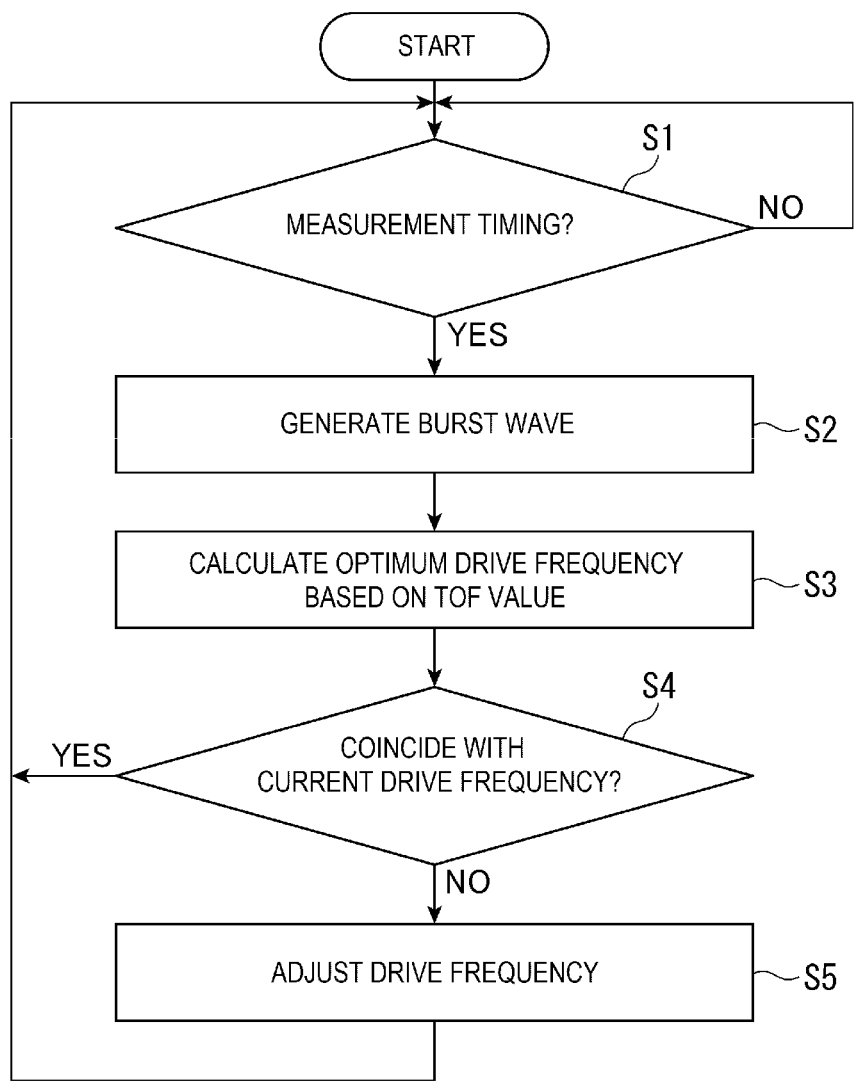
FIG. 2 is a flowchart for illustrating a method for controlling the fluidic device according to the first embodiment.

In the fluidic device 10A according to the second embodiment described above, similarly to the first embodiment described above, the control according to the flowchart in FIG. 2 is performed.

Here, a condition for generating a standing wave in the fluid S in the channel 20 is expressed by the following formula (1), similarly to the first embodiment. In the formula, Fs is an optimum drive frequency, m is an order of the standing wave SW, c is a sound velocity in the fluid S, and L is the channel width of the channel 20.

$$Fs = \frac{mc}{2L} \quad (1)$$

According to the transmission and reception part 40A of the second embodiment, a distance the ultrasonic wave covers in the fluid S in order to measure the TOF value is half of that in the first embodiment, and thus the sound velocity c in the fluid S is expressed by the following formula (4). In the formula, TOF is a TOF value measured by the TOF measurement circuit 54.

$$C = \frac{L}{TOF} \quad (4)$$

According to the above formulas (1) and (4), the optimum drive frequency Fs is expressed by the following formula (5).

$$Fs = \frac{m}{2TOF} \quad (5)$$

Therefore, in the second embodiment, in step S3 in the flowchart in FIG. 2, the optimum driving frequency Fs can be obtained by substituting the TOF value measured by the TOF measurement circuit 54 into the above formula (5).

According to the second embodiment, similarly to the first embodiment described above, even when a temperature of the fluid S changes, the standing wave SW can be stably generated.

In the second embodiment, the transmission and reception part 40A is divided into the second ultrasonic element 41 on the ultrasonic wave transmission side and the third ultrasonic element 42 on the ultrasonic wave reception side. Thus, even when the channel width L is small, reception noise due to reverberation at the time of ultrasonic wave transmission is less likely to occur. Therefore, as compared with the first embodiment, even when the channel width L is small, the driving of the standing wave generation part 30 can be feedback-controlled with high accuracy.

Third Embodiment

Next, a fluidic device 10B according to a third embodiment will be described with reference to FIG. 4.

Figure 4:
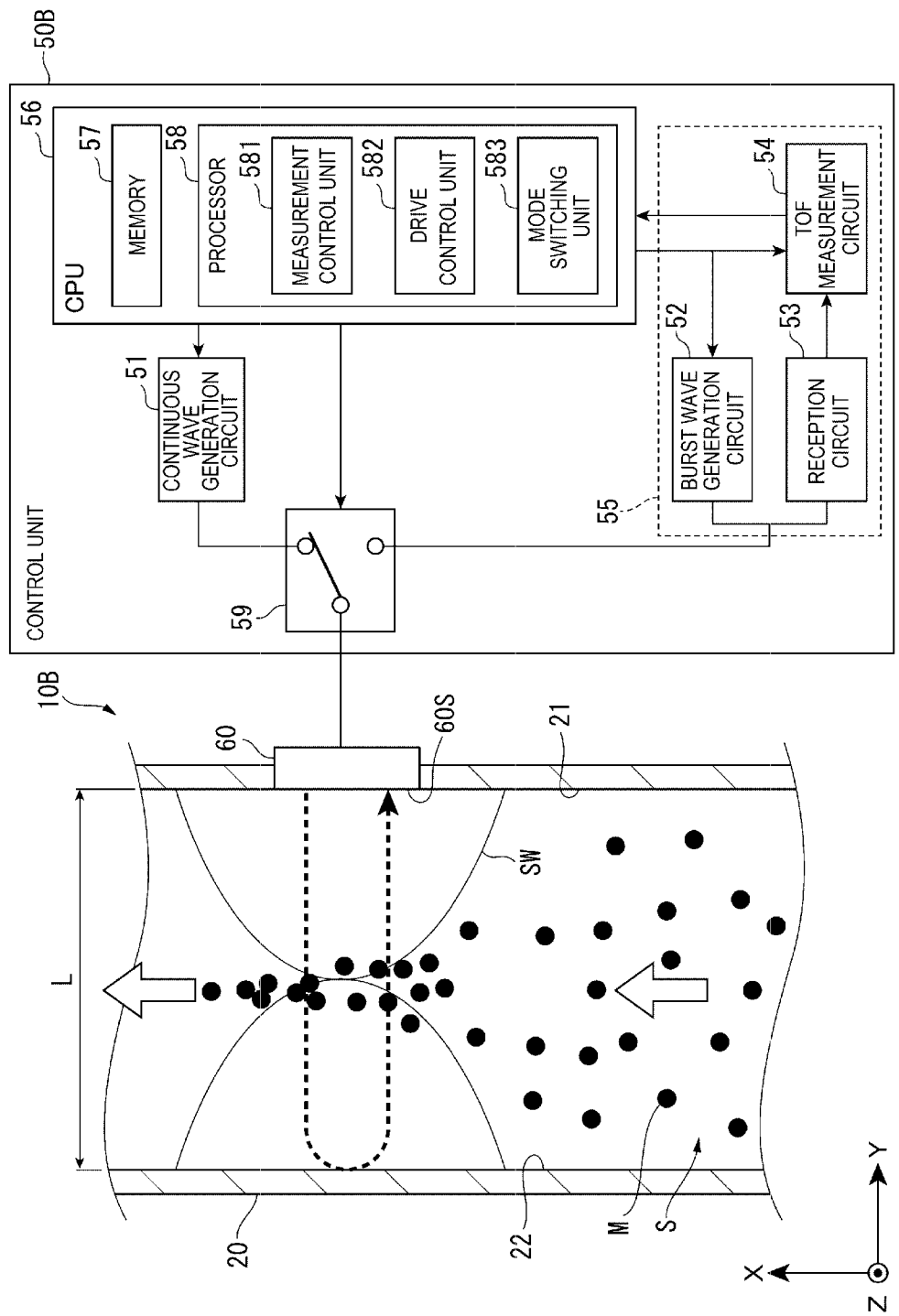
FIG. 4 is a diagram schematically illustrating a fluidic device according to a third embodiment.

FIG. 4 is a diagram schematically illustrating the fluidic device 10B according to the third embodiment.

In the fluidic device 10B, the standing wave generation part 30 and the transmission and reception part 40 in the first embodiment are implemented by the same ultrasonic element 60. In the following description, the same components as those in the first embodiment are denoted by the same reference signs, and a description thereof will be omitted or simplified.

In the third embodiment, the ultrasonic element 60 is provided at the channel 20, and can be switched between a first mode in which the ultrasonic element 60 operates as a standing wave generation part and a second drive mode in which the ultrasonic element 60 operates as a transmission and reception part.

The ultrasonic element 60 in the first mode generates the standing wave SW in the fluid S by transmitting an ultrasonic wave of a predetermined frequency to the fluid S in the channel 20.

The ultrasonic element 60 in the second mode transmits an ultrasonic wave of any frequency to the fluid S in the channel 20, and when receiving the ultrasonic wave transmitted through the fluid S, outputs a reception signal corresponding to the ultrasonic wave.

In particular, in the present embodiment, an ultrasonic transmission and reception surface 60S of the ultrasonic element 60 is disposed so as to constitute a part of the first wall surface 21 of the channel 20, and the ultrasonic element 60 receives the ultrasonic wave transmitted from the ultrasonic transmission and reception surface 60S and reflected by the second wall surface 22 of the channel 20.

A control unit 50B further includes a switch part 59 that switches between the first mode and the second mode of the ultrasonic element 60. One end of the switch part 59 is coupled to the ultrasonic element 60, and a coupling destination of the other end can be switched between the continuous wave generation circuit 51 and the burst wave generation circuit 52. In the control unit 50B, the processor 58 also functions as a mode switching unit 583 for controlling the coupling destination of the switch part 59.

Figure 5:
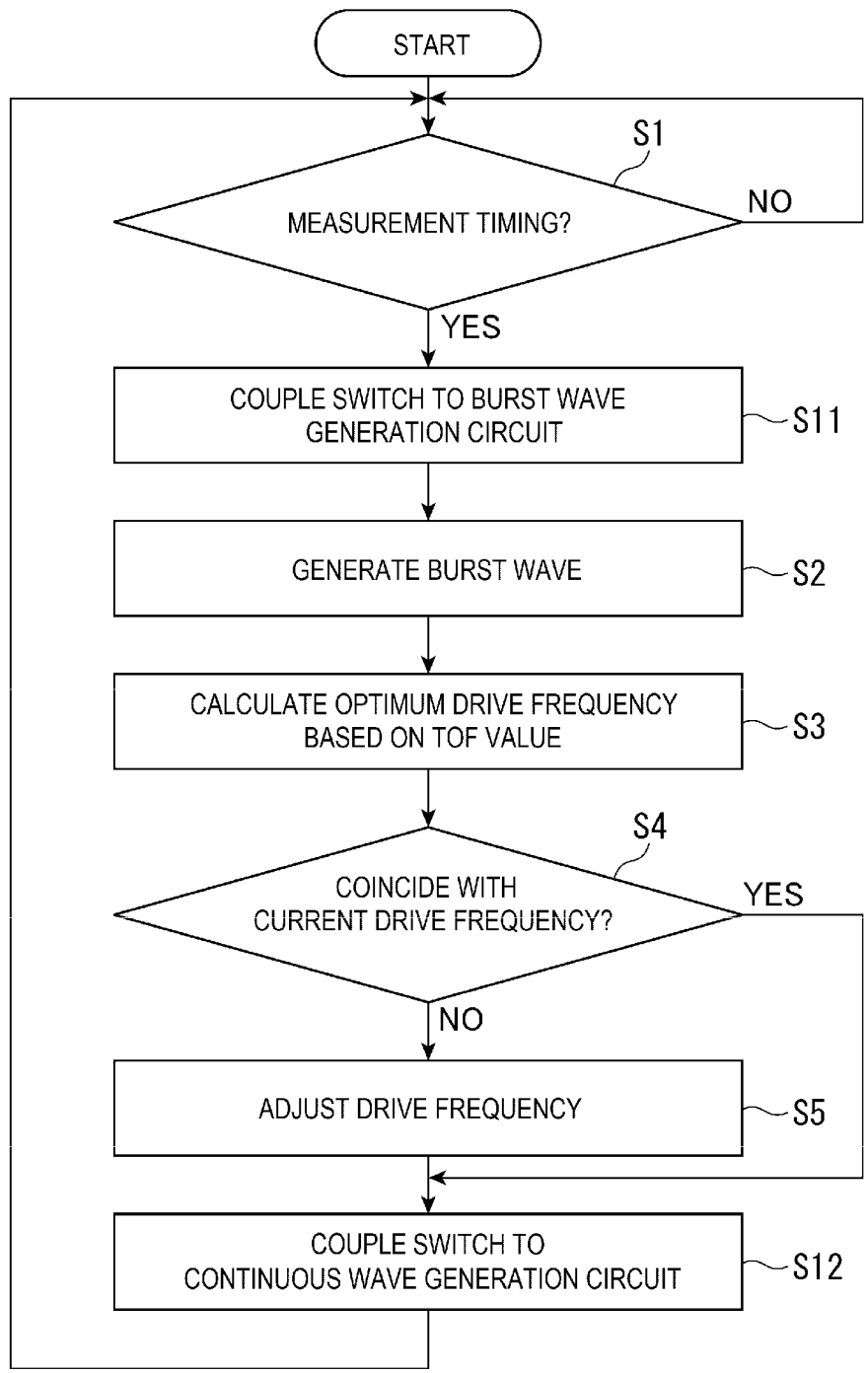
FIG. 5 is a flowchart for illustrating a method for controlling the fluidic device according to the third embodiment.

Next, control of the fluidic device 10B according to the third embodiment will be described with reference to the flowchart in FIG. 5. The same steps as those in the first embodiment are denoted by the same reference signs, and a description thereof may be simplified.

First, in an initial stage, the switch part 59 is coupled to the continuous wave generation circuit 51, and the ultrasonic element 60 in the first mode generates the standing wave SW.

When a predetermined measurement timing set in advance is reached (step S1: YES), the mode switching unit 583 outputs a switching signal to the switch part 59, and the measurement control unit 581 outputs a measurement request to the burst wave generation circuit 52. Then, the coupling destination of the switch part 59 is switched from the continuous wave generation circuit 51 to the burst wave generation circuit 52 (step S11), and the burst wave generation circuit 52 outputs, for a predetermined time, a drive signal for forming a burst wave (step S2). Accordingly, the ultrasonic element 60 switches from the first mode to the second mode, and transmits an ultrasonic wave for a predetermined time in accordance with the drive signal input from the burst wave generation circuit 52. The ultrasonic wave is transmitted to the fluid S, reflected by the second wall surface 22 of the channel 20, and then received by the ultrasonic element 60. The ultrasonic element 60 outputs a reception signal corresponding to the received ultrasonic wave, and the TOF measurement circuit 54 measures a TOF value, which is a period of time from when the ultrasonic element 60 transmits the ultrasonic wave to when the ultrasonic element 60 receives the ultrasonic wave, based on the reception signal.

Next, the drive control unit 582 obtains an optimum drive frequency Fs for generating a standing wave in the fluid S in the channel 20, based on the TOF value input from the TOF measurement circuit 54 (step S3).

Thereafter, the drive control unit 582 refers to the memory 57 and determines whether the optimum drive frequency Fs obtained in step S3 coincides with the drive frequency Fd of the ultrasonic element 60 in the first mode (step S4). When an absolute value of a difference between the drive frequency Fd and the optimum drive frequency Fs is equal to or less than a predetermined threshold, the drive control unit 582 may determine that the drive frequency Fd and the optimum drive frequency Fs coincide with each other.

When it is determined that the optimum drive frequency Fs coincides with the drive frequency Fd (step S4: YES), the processing in the control unit 50 proceeds to step S12 described later.

On the other hand, when it is determined that the optimum drive frequency Fs does not coincide with the drive frequency Fd (step S4: NO), the drive control unit 582 adjusts the drive frequency Fd so that the drive frequency Fd coincide with the optimum drive frequency Fs (step S5).

When the mode switching unit 583 outputs a switching signal to the switch part 59, the coupling destination of the switch part 59 is switched from the burst wave generation circuit 52 to the continuous wave generation circuit 51 (step S12). Accordingly, the ultrasonic element 60 is switched from the second mode to the first mode, and the generation of the standing wave SW is resumed.

Thereafter, the processing in the control unit 50 returns to step S1. In the control unit 50, it is preferable that the measurement timing is repeated at predetermined intervals set in advance, and the processing in the above-described flowchart is repeatedly performed.

According to the third embodiment, similarly to the first embodiment described above, even when a temperature of the fluid S changes, the standing wave SW can be stably generated.

In the third embodiment, since one ultrasonic element 60 serves as both the standing wave generation part and the transmission and reception part, the configuration of the fluidic device 10B can be simplified.

Modification

The present disclosure is not limited to the embodiments described above, and configurations obtained through modifications, alterations, and appropriate combinations of the embodiments within a scope of making it possible to achieve the object of the present disclosure are included in the present disclosure.

Although each of the standing wave generation part 30 and the transmission and reception part 40 forms a channel wall surface of the channel 20 in the first embodiment, the present disclosure is not limited thereto. For example, a wall member of the channel 20 may be disposed between the standing wave generation part 30 and the fluid S, or a wall member of the channel 20 may be disposed between the transmission and reception part 40 and the fluid S. When the wall member of the channel 20 is disposed between the transmission and reception part 40 and the fluid S, it is preferable to obtain the optimum drive frequency Fs by performing calculation processing in consideration of a transmission time of the ultrasonic wave in the wall member. The same applies to the second and third embodiments.

Although the transmission and reception part 40 is disposed such that the ultrasonic transmission and reception surface 40S faces the Y-axis direction in the first embodiment, the present disclosure is not limited thereto. The transmission and reception part 40 may be disposed such that the ultrasonic transmission and reception surface 40S faces a direction intersecting the Y-axis direction, for example, a Z-axis direction. In addition, in such a modification, it is preferable that a transmission and reception distance x, which an ultrasonic wave covers in the fluid S in order to measure a TOF value, is obtained in advance. Accordingly, in the above-described step S3, the optimum drive frequency Fs can be obtained by substituting the TOF value into the following formula (6). The modification also applies to the second embodiment.

$$Fs = \frac{m}{2L} \times \frac{x}{TOF} \quad (6)$$

In addition, in the above-described embodiments, the method of controlling the driving of the standing wave generation part based on the TOF value is not limited to the method of calculating the optimum drive frequency Fs, and other calculations such as obtaining a variation width of the frequency based on a variation width of the TOF value may be performed.

Overview of Present Disclosure

A fluidic device according to a first aspect of the present disclosure includes: a channel that extends along a first axis and through which a fluid flows; a standing wave generation part that generates a standing wave transmitting along a second axis orthogonal to the first axis in the fluid in the channel; a transmission and reception part that transmits an ultrasonic wave to the fluid in the channel and receives the ultrasonic wave transmitted through the fluid; a time-of-flight measurement unit that measures a time of flight that is a period of time from when the transmission and reception part transmits the ultrasonic wave to when the transmission and reception part receives the ultrasonic wave; and a drive control unit that controls driving of the standing wave generation part based on the time of flight.

Accordingly, the driving of the standing wave generation part can be feedback-controlled in accordance with temperature change of the fluid. As a result, even when the temperature of the fluid changes, the standing wave can be stably generated.

In the fluidic device according to the first aspect, the standing wave generation part may be a first ultrasonic element disposed at the channel; the transmission and reception part may be a second ultrasonic element disposed at a position different from a position of the first ultrasonic element in the channel; the time-of-flight measurement unit may measure the time of flight that is a period of time from when the second ultrasonic element transmits the ultrasonic wave to when the second ultrasonic element receives a reflected wave of the ultrasonic wave; and the drive control unit may control a drive frequency of the first ultrasonic element based on the time of flight.

With such a configuration, the transmission and reception part can be simply implemented by using the reflected wave in the channel.

In the fluidic device according to the first aspect, the standing wave generation part may be a first ultrasonic element disposed at the channel; the transmission and reception part may include a second ultrasonic element that is disposed at a position different from a position of the first ultrasonic element in the channel and that transmits the ultrasonic wave to the fluid in the channel, and a third ultrasonic element that is disposed at a position facing the second ultrasonic element in the channel and that receives the ultrasonic wave transmitted from the second ultrasonic element and transmitted through the fluid in the channel; the time-of-flight measurement unit may measure the time of flight that is a period of time from when the second ultrasonic element transmits the ultrasonic wave to when the third ultrasonic element receives the ultrasonic wave; and the drive control unit may control a drive frequency of the first ultrasonic element based on the time of flight.

With such a configuration, even when a channel width is small, the driving of the standing wave generation part can be feedback-controlled with high accuracy.

In the fluidic device according to the first aspect, the standing wave generation part and the transmission and reception part are implemented by the same ultrasonic element; a switch part is further provided that is configured to switch between a first mode in which the ultrasonic element operates as the standing wave generation part and a second mode in which the ultrasonic element operates as the transmission and reception part; the time-of-flight measurement unit measures the time of flight that is a period of time from when the ultrasonic element in the second mode transmits the ultrasonic wave to when the ultrasonic element in the second mode receives the ultrasonic wave; and the drive control unit controls a drive frequency of the ultrasonic element in the first mode.

With such a configuration, since one ultrasonic element serves as both the standing wave generation part and the transmission and reception part, a configuration of the ultrasonic device can be simplified.

According to a second aspect of the present disclosure, there is provided a method for controlling a fluidic device. The fluid device includes: a channel that extends along a first axis and through which a fluid flows; a standing wave generation part that generates a standing wave transmitting along a second axis orthogonal to the first axis in the fluid in the channel; and a transmission and reception part that transmits an ultrasonic wave to the fluid in the channel and receives the ultrasonic wave transmitted through the fluid. The control method includes: a measurement step of measuring a time of flight that is a period of time from when the transmission and reception part transmits the ultrasonic wave to when the transmission and reception part receives the ultrasonic wave; and a control step of controlling driving of the standing wave generation part based on the time of flight.

Accordingly, similarly to the first aspect according to the present disclosure, even when a temperature of the fluid changes, a standing wave can be stably generated.

What is claimed is:

1. A fluidic device comprising:
   a channel that extends along a first axis and through which a fluid flows;
   a first ultrasonic element that generates a standing wave transmitting along a second axis orthogonal to the first axis in the fluid in the channel, wherein the first ultrasonic element is disposed at the channel;
   a second ultrasonic element that transmits an ultrasonic wave to the fluid in the channel and receives the ultrasonic wave transmitted through the fluid, wherein the second ultrasonic element is disposed at a position different from a position of the first ultrasonic element in the channel;
   a time-of-flight measurement unit that measures a time of flight that is a period of time from when the second ultrasonic element transmits the ultrasonic wave to when the second ultrasonic element receives the ultrasonic wave; and
   a drive control unit that controls a drive frequency of the first ultrasonic element based on the time of flight.

2. A method for controlling a fluidic device, the fluidic device including:
   a channel that extends along a first axis and through which a fluid flows;
   a first ultrasonic element that generates a standing wave transmitting along a second axis orthogonal to the first axis in the fluid in the channel, wherein the first ultrasonic element is disposed at the channel; and
   a second ultrasonic element that transmits an ultrasonic wave to the fluid in the channel and receives the ultrasonic wave transmitted through the fluid, wherein the second ultrasonic element is disposed at a position different from a position of the first ultrasonic element in the channel, the control method comprising:
   measuring a time of flight that is a period of time from when the second ultrasonic element transmits the ultrasonic wave to when the second ultrasonic element receives the ultrasonic wave; and
   controlling a drive frequency of the first ultrasonic element based on the time of flight.

* * * * *